United States Patent [19]

Lyall

[11] Patent Number: 4,852,914
[45] Date of Patent: Aug. 1, 1989

[54] PLASTIC PIPELINE HAVING RAPIDLY FUSIBLE JOINTS AND METHOD OF MAKING SAME

[75] Inventor: Lucian H. Lyall, Woodland Hills, Calif.

[73] Assignee: Milfuse Systems, Inc., Santa Fe Springs, Calif.

[21] Appl. No.: 64,114

[22] Filed: Jun. 19, 1987

[51] Int. Cl.$^4$ ............................................. F16L 47/02
[52] U.S. Cl. ........................................ 285/21; 285/93; 285/423; 219/535
[58] Field of Search ................ 285/21, 22, 423, 93; 219/535, 544

[56] References Cited

U.S. PATENT DOCUMENTS

| | | |
|---|---|---|
| 509,603 | 11/1893 | Noll . |
| 599,558 | 2/1898 | Greenfield . |
| 2,050,728 | 8/1936 | Ost ................................. 29/148.2 |
| 2,398,788 | 4/1946 | Hedrick ............................. 285/183 |
| 2,741,402 | 4/1956 | Sayre ................................ 222/215 |
| 2,930,634 | 3/1960 | Merritt .............................. 285/21 |
| 2,961,363 | 11/1960 | Lowes ............................... 154/116 |
| 3,062,940 | 11/1962 | Bauer ................................ 229/19 |
| 3,198,560 | 8/1965 | Collins ............................. 285/286 |
| 3,378,672 | 4/1968 | Blumenkranz ..................... 219/200 |
| 3,394,952 | 7/1968 | Garrett ............................. 285/236 |
| 3,465,126 | 9/1969 | Blumenkranz ..................... 219/535 |
| 3,506,519 | 4/1970 | Blumenkranz ..................... 156/275 |
| 3,542,402 | 11/1970 | Caples et al. ..................... 285/21 |
| 3,788,928 | 1/1974 | Wise ................................ 156/294 |
| 3,943,334 | 3/1976 | Sturm .............................. 219/535 X |
| 3,969,170 | 7/1976 | Landgraf .......................... 156/187 |
| 3,987,276 | 10/1976 | Vogelsanger et al. .............. 219/535 |
| 4,090,899 | 5/1978 | Reich .............................. 156/293 |
| 4,117,311 | 9/1978 | Sturm .............................. 219/494 |
| 4,167,645 | 9/1979 | Carey . |
| 4,176,274 | 11/1979 | Lippera ............................ 219/522 |
| 4,224,505 | 9/1980 | Sturm .............................. 219/544 |
| 4,277,640 | 7/1981 | Kutnayak et al. . |
| 4,295,668 | 10/1981 | Loutham et al. .................. 285/21 |
| 4,334,146 | 6/1982 | Sturm .............................. 219/492 |
| 4,362,684 | 12/1982 | Thalmann . |
| 4,368,894 | 1/1983 | Parmann . |
| 4,416,713 | 11/1983 | Brooks . |
| 4,436,987 | 3/1984 | Thalmann et al. . |
| 4,436,988 | 3/1984 | Blumenkranz . |
| 4,486,650 | 12/1984 | Bridgestock et al. . |
| 4,487,432 | 12/1984 | Passerell ........................... 285/15 |
| 4,493,985 | 1/1985 | Keller ............................... 219/535 |
| 4,508,368 | 4/1985 | Blumenkranz ..................... 285/21 |
| 4,530,520 | 7/1985 | Nyffeler ............................ 285/21 |
| 4,530,521 | 7/1985 | Nyffeler ............................ 285/21 |
| 4,536,644 | 8/1985 | Thalmann . |
| 4,571,488 | 2/1986 | Reeves . |
| 4,618,168 | 10/1986 | Thalmann et al. . |

FOREIGN PATENT DOCUMENTS

| | | |
|---|---|---|
| 0149410 | 1/1985 | European Pat. Off. . |
| 1048106 | 12/1958 | Fed. Rep. of Germany . |
| 3005078 | 2/1980 | Fed. Rep. of Germany . |
| 3411179 | 1/1986 | Fed. Rep. of Germany ........ 285/21 |
| 5083152 | 1/1977 | Japan . |
| 5237984 | 3/1977 | Japan . |
| 143282 | 1/1961 | U.S.S.R. . |
| 695027 | 8/1953 | United Kingdom . |
| 808725 | 2/1959 | United Kingdom . |
| 809560 | 2/1959 | United Kingdom . |
| 1223128 | 2/1971 | United Kingdom . |
| 1373761 | 11/1974 | United Kingdom . |
| 1440713 | 6/1976 | United Kingdom . |
| 2090558 | 7/1982 | United Kingdom . |

*Primary Examiner*—Dave W. Arola
*Attorney, Agent, or Firm*—Fulwider, Patton, Rieber, Lee & Utecht

[57] ABSTRACT

A polyethylene pipeline including a plurality of prefabricated pipes of predetermined diameter fused on one end to respective bell fittings to form prefabricated bell and spigot pipe assemblies. The bell connector includes an enlarged in diameter bell connector formed with a socket having an internal diameter for telescopical receipt of the second end of the adjoining pipe length and includes an increased in diameter interior gland for receipt of a helical heating coil. The heating coil is constructed of an electrical resistant wire coated with an electrical insulative coating which is, in turn, coated with a medium density polyethylene coating. The terminal ends of the wire is coupled with electrical connectors protruding to the outside of the bell connector.

17 Claims, 1 Drawing Sheet

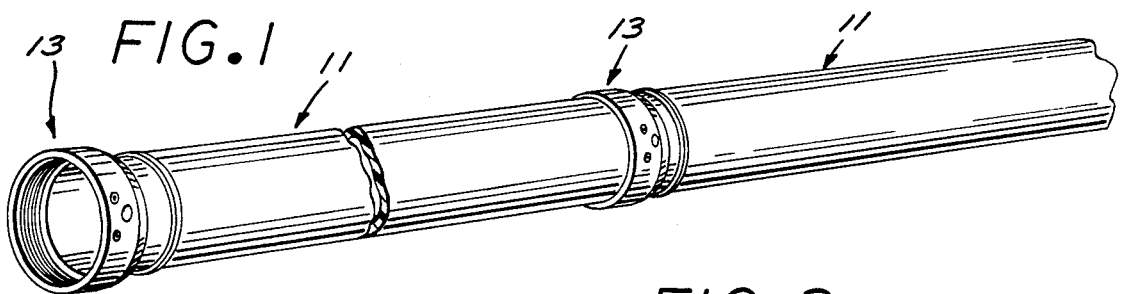
FIG. 1
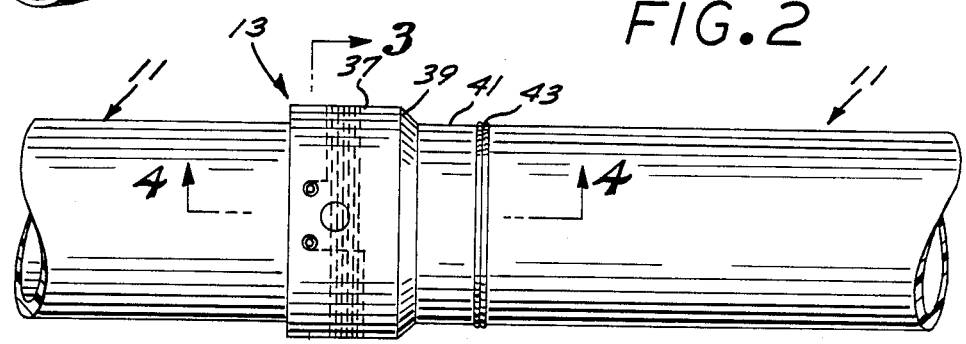
FIG. 2
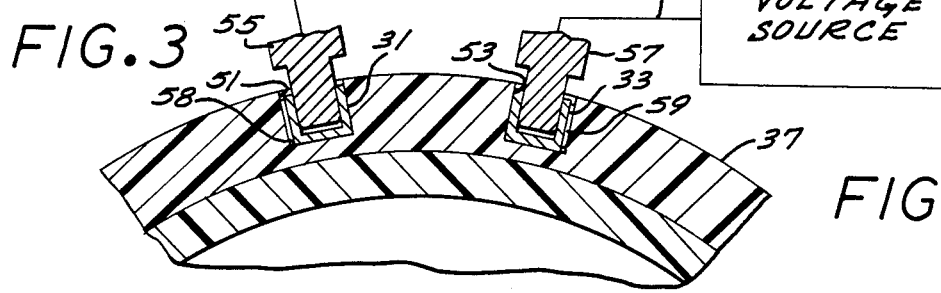
FIG. 3
FIG. 6
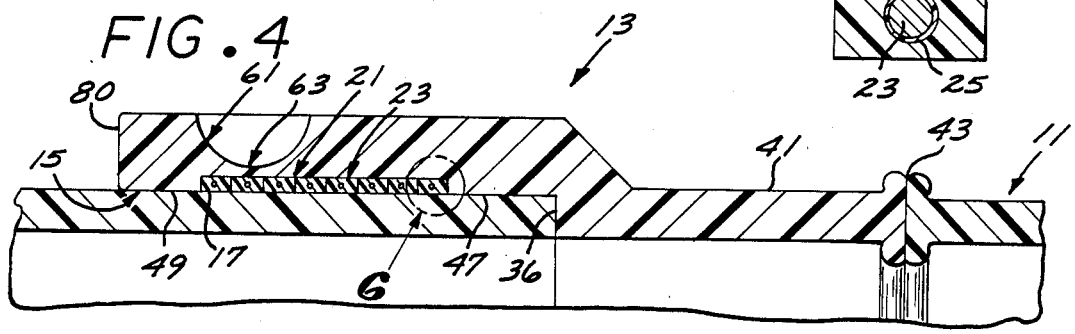
FIG. 4
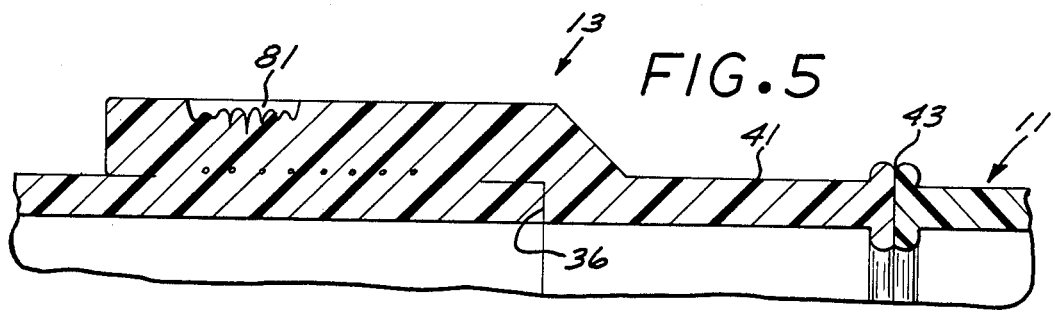
FIG. 5

PLASTIC PIPELINE HAVING RAPIDLY FUSIBLE JOINTS AND METHOD OF MAKING SAME

BACKGROUND OF THE INVENTION

1. Field of the Invention

The present invention relates to an electrofusion polyethylene pipe joint and, more particularly, to a rapidly deployable pipeline system for containing and transporting low pressure fluids.

2. Description of the Prior Art

With the advent of modern day warfare and terrorist activities, there exists a need for a system which may be rapidly deployed and activated to create obstacles delaying and obstructing advancement of armed personnel and armored vehicles, such as tanks. One such system has been proposed which employs plastic pipe wound in long lengths on large spools or reels, such that the pipe may be unwound from the reel and deployed in the ground by a trencher. The lengths are fused together at their ends to form a continuous length of underground pipe which may run over, for instance, several hundred meters. The deployed pipeline may then be filled with a high energy fluid, such as nitromethane, to be held in the ready for detonation at an opportune time to explode and excavate a trench which may be on the order of ten feet deep and twenty feet wide thus instantaneously creating an obstacle to advancement of armored vehicles. The advantages of such a system are recognized in that the pipeline may be laid along a course defined by, for instance, the perimeter of an airstrip, sensitive headquarters or even an international border. Such methods of deployment are characterized by certain drawbacks. First, the overall size of the spools necessary to spool large diameter plastic pipe, on the order of six inches in diameter, without subjecting the pipe to a permanent set or collapsing the wall thereof, results in unwieldly equipment difficult to transport and readily detectable in the deployment area. Additionally, rapid deployment of such a line over long distances multitude of spools thus raising the difficulty of transporting such spools and spooling equipment to and from the deployment site and spacing thereof along the course of the pipeline to be laid.

Thus, the advantages attendant assembly of such a pipeline utilizing multiple lengths of pipe, on the order of 20 or 30 feet per length, have long been recognized. Such pipe lengths could be easily bundled together for air transport and parachuted into the area of deployment. Such pipe lengths, being relatively light, could be deployed along the intended course of the pipeline by ground personnel and subsequently coupled together at the site. However, the realization of a practical pipeline system of this type has been long in coming since mechanical joints have proven expensive and impractical and typical fusion joints require on the order of 15 to 20 minutes to complete in the field thus rendering installation under combat conditions impractical. Consequently, there exists a need for an electrofusion joint which may be rapidly assembled and fused in the field.

Numerous different electrical fusion joints have been proposed in the past. A number of such electrofusion joints incorporate heating sleeves telescoped in coaxial relationship between a female connector and the male pipe. A joint of this type is shown in U.S. Pat. No. 3,378,672 to Blumenkranz. Joints of this type, while satisfactory for their intended use, suffer the shortcoming that they require three pieces, male connector, female connector and sleeve, to make a joint and typically incorporate low power heating coils. Thus, the field personnel would be faced with the necessity of transporting and assembling a separate sleeve at the site with the formation of the joint requiring on the order of 15 to 20 minutes at the best, all under tense conditions which contribute to the likelihood of error or incomplete fusion.

Other electrofusion joints have been proposed which incorporate a tubular body telescopable over the ends of plastic pipes and receiving a thermoplastic sleeve telescoped within the interior thereof. The heating coils are then gradually heated to about 180 degrees centigrade or 356 degrees Fahrenheit. A device of this type is shown in U.S. Pat. No. 4,362,684 to Thalmann. Again, such a joint suffers the shortcoming of requiring, in addition to the pipes being joined, two extra pieces. Furthermore, it has been common practice to heat such coils relatively gradually with about 20 amperes of power, thus requiring on the order of 15 to 20 minutes to achieve fusion.

Other efforts have led to electrofusion joints incorporating a bell connector for telescopical receipt of the end of an adjoining pipe, with a reinforcement tube being telescoped into the interior of the end of such pipe and a heating coil sleeve received coaxially between the pipe and bell fitting. This construction requires the application of an external compression force to compress the bell onto the heating coil during the fusion process. A device of this type is shown in U.S. Pat. No. 3,788,928 to Wise. While satisfactory for applications where time is not of the essence, such devices suffer the shortcoming of requiring multiple components and the application of external compressive forces during the fusion process.

U.S. Pat. No. 4,508,368 is another example of a bell connection joint incorporating a low temperature heating coil which requires external compression during the fusion process.

SUMMARY OF THE INVENTION

The present invention is characterized by prefabricated pipe lengths formed by thermoplastic pipe meltable at a predetermined temperature, each being fused to one end of thermoplastic bell coupling fittings formed with a neck having the same diameter as the pipe body and expanding radially to form an enlarged in diameter bell coupling defining a socket for telescopical receipt of an adjoining end of a second pipe. The socket is formed medially with an enlarged in diameter gland which receives a helical heating coil and cooperates with such adjoining end to act as an envelope for molten thermoplastic. The heating coil is formed by multiple coils of resistive wire coated with an electrically insulative coating which is, in turn, coated with a fusion coating of a thermoplastic having the same melting temperature as the pipe body. The helical coil is formed to receive a high level of electrical current for rapid heating thereof such that the coil may be heated rapidly to temperature above such second temperature to rapidly melt such fusion coating to puddle in such gland and fuse the bell coupling to such adjoining end.

The method contemplates selection of thermoplastic pipe sections of, for instance, medium density polyethylene, selection of bell coupling fittings of a high density polyethylene, and inserting thermoplastic coated heating coils in glands formed in such bell fittings and then telescoping the adjoining ends of pipes in such sockets, rapidly heating such coils.

Other objects and features of the invention will become apparent from consideration of the following description taken in connecton with the accompanying drawing.

BRIEF DESCRIPTION OF THE DRAWING

FIG. 1 shows a perspective view of a thermoplastic pipe system incorporating the present invention;

FIG. 2 is a broken elevation view, in enlarged scale, of a pipe joint formed in the pipe system shown in FIG. 1;

FIG. 3 is a partial sectional view, in enlarged scale, taken along the line 3—3 of FIG. 2 and diagrammatically showing a voltage source connected to the pipe coupling;

FIG. 4 is a longitudinal sectional view, in enlarged scale, taken along the line 4—4 of FIG. 2;

FIG. 5 is a longitudinal sectional view similar to FIG. 4 but showing the joint after fusion; and FIG. 6 is a cross sectional view, in enlarged scale, taken along the line 6—6 of FIG. 4.

DESCRIPTION OF THE PREFERRED EMBODIMENT

The rapidly fusible, thermoplastic pipe system of the present invention includes, generally, a plurality of lengths of thermoplastic pipe 11 constructed of medium or high density polyethylene and butt fused on one end to respective bell connector fittings 13 constructed of high density polyethylene. The bell fittings 13 are formed interiorly with a socket 15 for telescopical receipt of the end of an adjoining pipe, such sockets being formed medially with enlarged in diameter glands 17. Received in the gland is a helical heating coil, generally designated 21, formed from a length of coiled electrically resistive wire 23, coated with a coat of electrical insulation 25, such insulation being, in turn, coated with a coat of medium density polyethylene 27. The terminal ends of the resistive wire 23 are connected with respective electrical connectors 31 and 33 (FIG. 3) projecting externally of the bell fitting.

While electrofusion itself is well known in the art for joining thermoplastic pipe, fusion of the joints typically requires on the order of 15 to 20 minutes. In the present invention, however, the polyethylene of the pipes 11 has been selected with a melting point, or fusion temperature, of between 265 and 285 degrees Fahrenheit and the high density polyethylene in the bell fittings 13 with a similar melting point. With this arrangement, sufficient power may be applied to the coil 21 to heat it above the fusion temperature of about 285 degrees Fahrenheit in about one minute to complete fusion in about 90 seconds. It has been discovered that the resultant joint serves as a leak-proof joint for low pressure applications.

The bell fitting 13 is formed on one end with a neck 41 having a nominal diameter of 6⅝ inches to correspond with that of the pipe 11. The opposite end of such bell fitting is formed with an enlarged in diameter bell coupling 37 to telescope over the end of the adjoining pipe. The bell fitting 13 may thus be made separate from the pipe 11 and the end of the neck 41 fused to the end of such pipe at the place of manufacture to form a pipe length which is then ready for assembly and fusion in the field to form the overall pipe system.

It has been discovered that with a pipe having a nominal diameter of a little over six and one-half inches, the pipe 11 itself may be formed from commercially available extruded polyethylene pipe having an outside diameter of 6.625±0.011 inches for connection to a coupling 13 having the socket 15 formed with an interior diameter of 6.650±0.005 inches to thus provide a high integrity joint. Formed at the interior end of the socket 15 is an annular shoulder 36 which acts as a stop to limit insertion of the joining pipe 11. The gland 17 is formed with a diameter of 6.735±0.005 inches to provide the desired annular gland 17 for receipt of the heating coil 21. The gland 17 is formed medially in the socket 15 to form at the interior and exterior ends thereof respective lands 47 and 49 (FIG. 4).

The resistive wire 23 is constructed of copper magnet 25 gauge wire having a diameter of 0.025 inches and is coated with a 0.001 inch layer of 0.001 inch thick HML polyimide enamel to form a high temperature insulator having an outside diameter of approximately 0.027 inches. The polyimide insulator 25 is then coated with the medium density polyethylene coat 27 to form a rectangular cross section 0.090 inches lengthwise and 0.048 inches in the diametrical direction. The coil 21 is thus provided with a coating of medium density polyethylene which will melt at about 265–285 degrees Fahrenheit to facilitate the fusion process as described hereinafter.

Formed in the wall of the bell coupling 37 is a pair of outwardly opening blind radial bores 51 and 53 into which the electrical connectors 31 and 33 are press fit. The connectors 31 and 33 are cup shaped having a one degree outward taper in the walls thereof to form somewhat of a conical shape for complemental receipt therein of a pair of male electrical connectors 55 and 57, respectively. The opposite terminal ends 58 and 59 of the resistive wire 23 project radially outwardly from the gland 17 and along one side of the bores 51 and 53, respectively, to, when such connectors 31 and 33 are pressed into position, form good electrical contact therewith.

The exterior wall of the bell coupling 37 is formed with a recess defining a thumb well 61 which terminates at its lower end in a bottom wall spaced approximately 0.050 inches from the wall of the gland 17 to thus form a 0.050 thick membrane designed to melt when the coil 23 heats the gland to 285 degrees Fahrenheit. In this manner, once the heating coil 21 is heated sufficiently to melt the fusion coating 27 and conduct sufficient heat to the interior of the socket 15 to complete fusion, the membrane 63 will be melted, causing it to raise and thus provide a visual indication that fusion has been completed, as well as a tactile indication which may be sensed by the operator's thumb or finger in the event of night use.

The male electrical connectors 55 and 57 are slightly conical shape, having a taper of one degree to complement the taper of the connector cups 31 and 33. Such male connectors are connected with a voltage source, generally designated 71, by means of electrical leads 73 and 75. The voltage source 71 in the preferred embodiment generates 230 volts DC which is operative to flow approximately 40 amperes of electrical current through the coil 21 to rapidly raise the temperature thereof to provide for rapid fusion as described hereinafter.

In operation, it will be appreciated that the thermoplastic pipes 11 may be extruded in a conventional manner and the bell fittings 13 molded to the general configuration shown providing a neck 41 and bell coupling 37. The interior of the bell coupling 37 may then be machined to form the socket 15 having the closely held tolerances of about ±0.005 inches to thus minimize the accumulated tolerance variation between the pipe and socket. It is important that such dimensions be closely held so that the space between the lands 47 and 49 and the exterior surface of the pipe be held to a reasonable minimum to thereby present a narrow annular heat path between the pipe 11 and lands 47 and 49 leading to the end 80 of the bell coupling to thus form a thermal barrier which serves to hold the heat in the gland 17 during fusion. In practice, the pipe wall has a thickness of about one quarter of an inch and the bell coupling 37 a wall thickness of about 0.440 inches.

The helical coil 21 may be formed by extruding the insulative coating 25 thereon. It has been discovered that an insulative coating of polyimide may be extruded thereon and the medium density fusion coating 27 then extruded over the insulative coating 25. The coated wire 23 is then wound on a mandril to a diameter corresponding with that of the gland 17 and the coil then compressed radially and slid telescopically into the socket 15 to be received in the gland. The coil may be held in position by the inherent resiliency of the wire 23. The bores 51 and 53 may then be formed in the wall of the bell coupling 37 and the electrical fittings 31 and 33 pressed into position, being sure to maintain the terminal ends 58 and 59 of such wire 23 in good electrical contact. The thumb well 61 may then be formed to a depth leaving a membrane of about 0.050 inches.

The bell fitting 13 may then be butt fused to the end of the pipe 11 in a conventional manner, it being appreciated that the time required to complete these steps at the factory is not of critical importance. The completed prefabricated lengths may conveniently be bundled together in, for instance, groups of 20 and stored for subsequent shipment. When the system is to be deployed on site, as for instance, in a battle field to provide explosives for instantaneous formation of a tank barrier, the bundles may be air lifted to the battle zone. The bundles may be distributed along a predetermined path, as by parachuting from a cargo plane. The ground personnel may retrieve the bundles of pipe lengths and distribute them along the precise path. Relatively unskilled personnel may then be employed to join the prefabricated pipe sections together. This step may be achieved by telescoping the ends of adjoining pipe into respective sockets 15 of the bell fittings 13. A clamping mechanism (not shown) may be clamped to the individual bell couplings 13 and pipes 11 and activated to drive the end of the pipe firmly into the socket 15, against the shoulder 36 and hold it firmly in position during the fusion process. The voltage source 71 may be connected to the electrical couplings 31 and 33 by means of the male fittings 55 and 57, as by press fitting into position. The power source 71 may then be actuated to provide supply power providing current flow on the order of 40 amperes. Such current flow serves to rapidly heat the coil, as in about one minute, to an elevated temperature on the order of 500 degrees Fahrenheit.

The resistive wire 23 is quickly heated and the heat transferred across the electrically insulative coating 25 to the fusion coating 27 (FIG. 6). It will be appreciated that the fusion coating 27, being relatively thin but fully encasing the insulative coating 25 and resistive wire 23, serves to provide for efficient heat transfer thereto thus providing for rapid melting thereof to form a puddle of joining thermoplastic within the gland 17. Heat will continue to be propagated efficiently though the joining thermoplastic within the gland to the exterior surface of the joining pipe 11. It will be appreciated that the medium density coating 27 and pipe 11 will melt at about 265 to 285 degrees Fahrenheit, thus forming a puddle of molten fusion material in the gland 17 while the high density bell coupling 37, for a time, retains its integrity defining an envelope for the fusion material. As the temperature is raised even further, the molten polyethylene will tend to boil or agitate thus propagating heat to diffuse outwardly in the polyethylene of the bell coupling 37. As the parent polyethylene of the bell coupling is melted, the 0.050 inch thick membrane 63 will also melt thus flowing the polyethylene upwardly in the well 61 to form the contour 81 shown in FIG. 5. By the time the joint has become fully fused as depicted in FIG. 5, the male electrical connectors 55 and 57 may then be disconnected and the power source 71 moved on to the next joint.

It has been demonstrated that the entire fusion process may be completed in on the order of three minutes. This includes approximately one and one-half minutes to align the pipe and bell fittings, insert the pipe and clamp, the fusion itself requiring only about one and one-half minutes.

After joinder of the entire pipeline system is completed, it may be buried in a trench to be disposed, for instance, seven feet below the surface. The system may then be opened at a higher elevation as for instance on a hill top, and a liquid explosive, such as nitromethane, introduced to fill the entire line. A pig may be inserted ahead of the fluid and the fluid introduced gravity feed to drive the pig therealong and remove air from the system. A previously installed detonator cap may then be coupled to a detonator system to ready the system for detonation at the opportune moment. The system enjoys the capability of also allowing for the explosive liquid to subsequently be withdrawn from the system for the purposes of disabling the system or for replacement thereof.

It will be appreciated from the foregoing that the rapidly fusible thermoplastic pipeline system of the present invention provides a convenient and rapid means for deploying a long pipeline system which may receive and retain low pressure fluids in a leak proof manner.

Various modifications and changes may be made with regard to the foregoing detailed description without departing from the spirit of the invention.

I claim:

1. A rapidly fusible plastic pipe system comprising:
   a plurality of thermoplastic pipes of a predetermined outside diameter, having a predetermined fusion temperature, and further having first and second ends;
   a plurality of thermoplastic connection fittings having selected fusion temperature at least as high as said predetermined temperature and including respective necks prefused to said first ends of the respective pipes to form prefabricated pipe lengths and further including bell connectors formed with sockets for telescopical receipt of the respective second ends of the respective joining pipes, said bell connectors being formed medially in the respective sockets with heating coil-receiving glands;
   helical heating coils formed from a length of coiled resistance wire coated with an electrically insulative coat, said insulative coat in turn coated with a thermoplastic fusion coat having a fusion temperature substantially the same as said predetermined temperature, said heating coils being nested in the respective glands and including terminal ends; and a pair of electrical connectors embedded in the walls of the respective bell connectors and connected with the respective terminal ends, whereby said prefabricated pipe lengths may be deployed at an installation site, said second ends rapidly telescoped into said sockets, and an electrical voltage applied across said connectors to heat said heating coils to said selected fusion temperature to rapidly melt said fusion coating to form a puddle of molten fusion material within the envelope formed between the respective gland and periphery of the adjoining pipe ends and continuing application of said voltage to continue to propagate heat rapidly through said molten material to the wall of said pipes and the wall of said bell connectors to fuse said second end in the respective sockets;

said bell connectors each including a wall section formed with an exterior radial recess defining a well terminating in a bottom wall spaced a predetermined distance from said heating coil, said predetermined distance being such that, when said pipe lengths have been telescoped together and said heating coils have been energized sufficiently long to generate sufficient heat to melt said fusion coating and the interior surfaces of the joining socket, said bottom wall will melt to give an indication that fusion has been completed.

2. A rapidly fusible plastic pipe system comprising:

a plurality of prefabricated thermoplastic pipe lengths, each pipe length characterized by a predetermined fusion temperature and including a first extremity having a predetermined outside diameter and a second extremity having an interior surface defining a bell socket adapted to telescopically receive the first extremity of another of said pipe lengths in close fitting relationship, the second extremity also having an exterior surface defining an indicator recess with a bottom wall spaced sufficiently close to the interior surface to melt when fusion is substantially complete;

a heating coil embedded in the second extremity of each pipe length adjacent the interior surface thereof; and connection means in electrical communication with the heating coil and adapted for rapid connection to an electric power source, whereby said pipe lengths can be deployed to an installation site, the first extremities of various ones of the pipe lengths can be telescoped into the bell sockets in the second extremities of various others of the pipe lengths to form a pipeline, and an electric power source can sequentially be connected to the various connection means to heat the corresponding heating coil to a sufficient temperature to rapidly fuse the pipe lengths together and disconnected when the bottom wall of the indicator recess melts, indicating that fusion is substantially complete.

3. A system according to claim 2 wherein each pipe length comprises a thermoplastic pipe characterized by said predetermined outside diameter and a thermoplastic fitting defining therein the bell socket, the fitting having a neck which is butt fused to an end of the pipe.

4. A system according to claim 2 wherein each heating coil comprises resistance wire coated with thermoplastic material.

5. A system according to claim 4 wherein the coatings comprise medium density thermoplastic and the second extremities of the pipe lengths comprise high density thermoplastic.

6. A system according to claim 5 wherein the resistance wire develops a temperature of at least 285 degrees Fahrenheit in its coating upon application of electric power having a predetermined voltage.

7. A system according to claim 6 wherein said temperature is developed within about one minute after application of the power.

8. A rapidly fusible plastic pipe system comprising: a plurality of prefabricated thermoplastic pipe lengths, each pipe length characterized by a predetermined fusion temperature and including a first extremity characterized by a predetermined outside diameter and a second extremity fabricated of high density thermoplastic and having an interior surface defining a bell socket adapted to telescopically receive the first extremity of another of said pipe lengths in close fitting relationship, the bell socket including a gland adapted to receive a heating coil wherein the second extremity of each pipe length has an exterior surface defining an indicator recess with a bottom wall spaced sufficiently close to the interior surface to melt when fusion is substantially complete;

a heating coil fabricated of resistance wire coated with medium density thermoplastic and disposed in the gland; and connection means in electrical communication with the heating coil and adapted for rapid connection to an electrical power source;

whereby said pipe lengths can be deployed to an installation site, the first extremities of various ones of the pipe lengths can be telescoped into the bell sockets in the second extremities of various others of the pipe lengths to form a pipeline, and an electric power source can sequentially be connected to the various connection means to heat the corresponding heating coil to a sufficient temperature to melt the medium density thermoplastic, the molten thermoplastic being operative to transfer heat from the heating coil to the first extremity of the pipe length in the socket and to the interior surface of the socket and thereby to rapidly fuse the pipe lengths together.

9. A rapidly fusible plastic pipe system comprising:

a plurality of prefabricated thermoplastic pipe lengths, each pipe length characterized by a predetermined fusion temperature and including a first extremity characterized by a predetermined outside diameter and a second extremity of high density thermoplastic having an interior surface defining a bell socket adapted to telescopically receive the first extremity of another of said pipe lengths in close fitting relationship;

a heating coil embedded in the second extremity of each pipe length adjacent the interior surfaces thereof, said heating coil comprising a resistance wire coated with medium density thermoplastic material;

connection means in electrical communication with the heating coil and adapted for rapid connection to an electric power source; and a tactile fusion indicator formed in an exterior surface of the second extremity of each pipe length and operative to provide a tactile indication when fusion is substantially complete;

whereby said pipe lengths can be deployed to an installation site, the first extremities of various ones of the pipe lengths can be telescoped into the bell sockets in the second extremities of various others of the pipe lengths to form a pipeline, and an electric power source can sequentially be connected to the various connection means to heat the corresponding heating coil to a sufficient temperature to rapidly fuse the pipe lengths together and disconnected when the fusion indicator indicates that fusion is substantially complete.

10. A system according to claim 9 wherein the resistance wire develops a temperature of at least 285 degrees Fahrenheit in its thermoplastic coating upon application of electric power having a predetermined voltage.

11. A system according to claim 10 wherein said temperature is developed within about one minute after application of the power.

12. A method of constructing a plastic pipeline, the method comprising:

fabricating a plurality of fittings of high density thermoplastic material characterized by a predetermined fusion temperature, each fitting having a neck adapted for butt fusing to a thermoplastic pipe and an interior surface defining a bell socket adapted to telescopically receive a thermoplastic pipe characterized by a predetermined outside diameter in close fitting relationship;

embedding a heating coil in each fitting in a gland defined in the interior surface of the fitting, said heating coil comprising a resistance wire coated with medium density thermoplastic material and including connection means adapted for rapid connection to an electric power source;

fabricating a plurality of thermoplastic pipe lengths by butt fusing the necks of various ones of said fittings to various ones of plurality of thermoplastic pipes characterized by said predetermined fusion temperature, each resulting length having a first extremity characterized by a said outside diameter and a second extremity which includes one of said fittings;

deploying said pipe lengths;

deploying an electric power source;

telescoping the first extremities of various ones of the pipe lengths into the bell sockets in the second extremities of various others of the pipe lengths to form a pipeline; and sequentially connecting the power source to the various connection means to heat the corresponding heating coil to a sufficient temperature to rapidly fuse the pipe lengths together and disconnecting the power source when the fusion is substantially complete.

13. A method according to claim 12 wherein the temperature to which the heating coil is heated is high enough to melt the thermoplastic coating, the molten thermoplastic being operative to transfer heat from the heating coil to the first extremity of the pipe length in the socket and to the interior surface of the socket.

14. A method according to claim 13 wherein the temperature to which the heating coil is heated is high enough to boil and thereby agitate the molten thermoplastic.

15. A method according to claim 13 wherein the steps of telescoping the first extremity of one of the pipe lengths into the socket in the second extremity of another of the pipe lengths and connecting the power source to the connection means of said second extremity to fuse the pipe lengths together and disconnecting the power source when fusion is substantially complete are accomplished in not more than about 90 seconds.

16. A method of constructing a plastic pipeline, the method comprising:

fabricating a plurality of fittings of thermoplastic material characterized by a predetermined fusion temperature, each fitting having neck adapted for butt fusing to a thermoplastic pipe and an interior surface defining a bell socket adapted to telescopically receive a thermoplastic pipe characterized by a predetermined outside diameter in close fitting relationship;

forming an indicator recess in an exterior surface of each fitting, the recess having a bottom wall spaced sufficiently close to the interior surface to melt when fusion is substantially complete;

embedding a heating coil in each fitting adjacent the interior surface, the heating coil including connection means adapted for rapid connection to an electric source;

fabricating a plurality of thermoplastic pipe lengths by butt fusing the necks of various ones of said fittings to various ones of a plurality of thermoplastic pipes characterized by said predetermined fusion temperature, each resulting length having a first extremity characterized by said outside diameter and a second extremity which includes one of said fittings;

deploying said pipe lengths;

deploying an electric power source;

telescoping the first extremities of various ones of the pipe lengths into the bell sockets in the second extremities of various others of the pipe lengths to form a pipeline; and sequentially connecting the power source to the various connection means to heat the corresponding heating coil to a sufficient temperature to rapidly fuse the pipe lengths together and disconnecting the power source when the fusion is substantially complete.

17. A method of constructing a plastic pipeline, the method comprising:

fabricating a plurality of thermoplastic pipe lengths, each pipe length characterized by a predetermined fusion temperature and including a first extremity characterized by a predetermined outside diameter, a second extremity fabricated of high density thermoplastic and having an interior surface defining a bell socket adapted to telescopically receive the first extremity of another of said pipe lengths in close fitting relationship and an indicator recess in an exterior surface of each bell socket the recess having a bottom wall spaced sufficiently close to the interior surface to melt when fusion is substantially complete, a heating coil fabricated of resistance wire coated with medium density thermoplastic and disposed in a gland in the bell socket, and connection means in electrical communication with the heating coil and adapted for rapid connection to an electric power source;

deploying said pipe length;
deploying an electric power source;
telescoping the first extremities of various ones of the pipe lengths into the bell sockets in the second extremities of various others of the pipe lengths to form a pipeline; and
sequentially connecting the power source to the various connection means to heat the corresponding heating coil to a sufficient temperature to melt the medium density thermoplastic, the molted thermoplastic being operative to transfer heat from the heating coil to the exterior surface of the pipe length in the socket and to the interior surface of the socket and thereby to rapidly fuse the pipe lengths together, and disconnecting the power source when the fusion is substantially complete.

* * * * *